(12) United States Patent
Lai et al.

(10) Patent No.: US 10,748,033 B2
(45) Date of Patent: Aug. 18, 2020

(54) OBJECT DETECTION METHOD USING CNN MODEL AND OBJECT DETECTION APPARATUS USING THE SAME

(71) Applicant: Industrial Technology Research Institute, Hsinchu (TW)

(72) Inventors: Wei-Hao Lai, New Taipei (TW); Pei-Jung Liang, Taichung (TW); Peter Chondro, Hsinchu County (TW); Tse-Min Chen, Hsinchu (TW); Shanq-Jang Ruan, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 111 days.

(21) Appl. No.: 16/215,675

(22) Filed: Dec. 11, 2018

(65) Prior Publication Data

US 2020/0184260 A1 Jun. 11, 2020

(51) Int. Cl.
G06K 9/62 (2006.01)
(52) U.S. Cl.
CPC ......... *G06K 9/6249* (2013.01); *G06K 9/6262* (2013.01)
(58) Field of Classification Search
CPC .......... G06K 9/00805; G06K 9/00335; G06K 9/00771; G06K 9/6263; G06K 9/00825
See application file for complete search history.

(56) References Cited

U.S. PATENT DOCUMENTS 7,227,893 B1 * 6/2007 Srinivasa ........... G06K 9/00771
348/155
7,436,887 B2 * 10/2008 Yeredor ............. G06K 9/00771
375/240.01

(Continued)

FOREIGN PATENT DOCUMENTS

CN 105706144 6/2016
CN 107730905 2/2018

(Continued)

OTHER PUBLICATIONS

Hiroshi Fukui, et al, "Random Dropout and Ensemble Inference Networks for Pedestrian Detection and Traffic Sign Recognition.", Transactions of Information Processing Society of Japan, vol. 57, No. 3, Mar. 2016, pp. 910-921.

(Continued)

*Primary Examiner* — Yosef Kassa
(74) *Attorney, Agent, or Firm* — JCIPRNET

(57) ABSTRACT

The disclosure is directed to an object detection method using a CNN model and an object detection apparatus thereof. In an aspect, the object detection method includes generating a sensor data; processing the sensor data by using a first object detection algorithm to generate a first object detection result; processing the first object detection result by using a plurality of stages of sparse update mapping algorithm to generate a plurality of stages of updated first object detection result; processing a first stage of the stages of updated first object detection result by using a plurality of stages of spatial pooling algorithm between each of stages of sparse update mapping algorithm; executing a plurality of stages of deep convolution layer algorithm to extract a plurality of feature results; and performing a detection prediction based on a last-stage feature result.

21 Claims, 14 Drawing Sheets

(56) References Cited

U.S. PATENT DOCUMENTS

| | | | | |
|---|---|---|---|---|
| 7,639,840 | B2* | 12/2009 | Hanna | G08B 13/19613 382/103 |
| 8,200,733 | B1* | 6/2012 | Neeman | H03M 13/2739 708/490 |
| 8,208,733 | B2* | 6/2012 | Park | G06K 9/00771 382/199 |
| 8,542,276 | B2* | 9/2013 | Huang | G06K 9/00771 348/143 |
| 8,965,114 | B2* | 2/2015 | Aoba | G06T 7/00 382/100 |
| 2013/0129199 | A1 | 5/2013 | Russakovsky et al. | |
| 2017/0124409 | A1 | 5/2017 | Choi et al. | |
| 2018/0068198 | A1 | 3/2018 | Savvides et al. | |
| 2018/0107900 | A1 | 4/2018 | Takahashi | |
| 2018/0336424 | A1 | 11/2018 | Jang et al. | |
| 2018/0336683 | A1 | 11/2018 | Feng et al. | |

FOREIGN PATENT DOCUMENTS

| | | |
|---|---|---|
| CN | 107967515 | 4/2018 |
| CN | 108496188 | 9/2018 |
| CN | 108564109 | 9/2018 |
| CN | 108761475 | 11/2018 |
| JP | H064714 | 1/1994 |
| JP | 2018022484 | 2/2018 |
| TW | 201101814 | 1/2011 |
| TW | 201816745 | 5/2018 |
| TW | I630544 | 7/2018 |
| TW | 201839665 | 11/2018 |

OTHER PUBLICATIONS

"Office Action of Japan Counterpart Application", dated Mar. 31, 2020, p. 1-p. 6.

Wang et al., "Object-centric Sampling for Fine-grainedImage Classification," arXiv, 1412.3161v1, 2014, pp. 1-9.

Chu et al., "Fast Object Detection Using MultistageParticle Window Deformable Part Model," 2014 IEEE International Symposium on Multimedia, 2014, pp. 98-101.

Navneet Dalal et al., "Histograms of oriented gradients forhuman detection," 2005 IEEE Computer Society Conference on Computer Vision and Pattern Recognition (CVPR'05), 2015, pp. 1-8.

Shaoqing Ren et al., "Faster r-cnn: Towards real-time objectdetection with region proposal networks," arXiv, 1506.01497v3, 2016, pp. 1-14.

Chen et al., "Vehicle detection in satellite images byhybrid deep convolutional neuralnetworks," IEEE Geoscience and Remote Sensing Letters, vol. 11, No. 10, Oct. 2014, pp. 1797-1801.

Shinpei Kato et al., "An open approach to autonomous vehicles," IEEE Computer Society, 2015, pp. 60-68.

Pierre Sermanet et al., "Overfeat: Integrated recognition, localization and detection using convolutional networks," arXiv, 1312.6229v4, 2014, pp. 1-16.

Cong Tang et al., "The object detection based on deep learning," 2017 4th International Conference on Information Science and Control Engineering, 2017, pp. 1-6.

Sadi Vural et al., "Multi-view fast object detection using extended haar filters in uncontrolled environments," Pattern Recognition Letters, vol. 33, 2012, pp. 126-133.

Liu et al., "SSD: Single Shot MultiBox Detector," arXiv, 1512.02325v5, 2016, pp. 1-17.

Arthur Ouaknine, "Review of deep learning algorithms for object detection," Available at: https://medium.com/comet-app/review-of-deep-learning-algorithms-for-object-detection-c1f3d437b852.

NVIDIA Developer, "NVIDIA cuDNN," Available at: https://developer.nvidia.com/cudnn.

"Chainer: A flexible framework for neural networks," Available at: https://chainer.org/.

Everingham et al, "The pascal visual object classes (voc) challenge," Int J Comput Vis, vol. 88, 2010, pp. 303-338.

"Office Action of Taiwan Counterpart Application", dated May 4, 2020, p. 1-p. 3.

* cited by examiner

OBJECT DETECTION METHOD USING CNN MODEL AND OBJECT DETECTION APPARATUS USING THE SAME

TECHNICAL FIELD

The disclosure is directed to an object detection method using a convolutional neural network (CNN) model, and an object detection apparatus using the same method.

BACKGROUND

The development of autonomous vehicles has been an important research and development project in recent years, and a detecting or sensing apparatus has been especially important. A detecting apparatus could be improved by providing more reliable sensing data and by providing more precise information regarding the surroundings of a vehicle body within a specific type of environment. The detecting apparatus could also create enhanced information based on sensor readings of the surroundings of a vehicle body. In the construction of the detecting apparatus, object detection is one of the indispensable technologies. By identifying the location and type of objects that appear in front of the vehicle based on images taken by a high-resolution camera mounted on the body of the vehicle, and also by combining technologies such as computer vision and deep learning, a vehicle can make an accurate decision to determine whether to dodge an object or to apply the brakes. The decision making could be similar to an artificial intelligence which adopts a strategy based on observation through its eyes.

However, various object detections may rely on deep learning methods. Deep learning is a general term for using training data in order to modify a learning model. Deep learning may require a large amount of computing resources to train and approximate the learning model. When the detection apparatus performs object detection, the trained model would be used for forward propagation calculation. The computational amount could be substantial during both the training phase and the prediction phase. Without a hardware device with high computing power, such endeavor could be nearly impossible as the number of image processing frames per second is large within a very small interval. Therefore, continuous optimizations in the algorithm level for object detection would still be necessary at this point in time.

The object detection algorithm could help the autonomous vehicle to sense any object within the sensing range while a person is driving, and the algorithm would also provide other systems with early path planning. To meet this demand, an excellent detecting apparatus has to satisfy at least three important characteristics including high volume (i.e. numbers of identifiable objects), accuracy (i.e. correctly identifies the type of object and the location of object), and fast (i.e. the reaction needed to reach an instantaneous computation rate). In order to satisfy the above characteristics, it is necessary to make improvements and modifications to the existing deep learning models.

Table 1 shows a comparison of characteristics among three kinds object detection model of the existing deep learning model.

TABLE 1

| Constraints | Traditional ROI Proposal | Single Step DL Object Detection | Double Steps DL Object Detection |
| --- | --- | --- | --- |
| detection accuracy | low | mild | high |
| false positive rate | high | mild | low |
| computational cost (inference) | low | mild | high |
| training process | no | average | large |

Table 1 shows a predicament that the object detections must compromise to detect performance and computational complexity as higher performance in object detection would constitute a higher computational complexity. Herein, the Double Steps DL Object Detection model has the highest detection accuracy, but it typically requires the largest computational cost. In detail, the double steps DL object detection adopting similar convolution layers as in the single step DL object detection, with the difference is that the double steps DL employs a region proposal network (RPN) after those convolution layers to propose region(s) of interest (ROI) from the provided feature maps. FIG. 1 illustrates the proposed regions of interest from the RPN based on the extracted feature map from the last convolution layers. In further details, the processor would process a set of the provided feature maps (i.e. input frame illustrated in FIG. 1) by using the RPN to propose some ROI in the Double Steps DL Object Detection model in which the feature map includes a plurality of unused features (i.e. unused features UNU). The plurality of unused features UNU would require certain amount of computational cost, which is dispense ineffectively as the plurality of unused features UNU do not contribute for any detection result.

In other words, the RPN in the Double Steps DL Object Detection model has two drawbacks that reduces the efficiency of the detection framework. Firstly, as the RPN analyses the provided feature maps for any potential candidate for ROI proposal; there could be a plurality of unused features UNU that would not contribute to any ROI proposal yet these unused features UNU demand certain amount of computational cost to be computed by RPN. The first feature is unnecessary calculating parts (i.e. the plurality of unused features) which result in a computational waste caused by operations in the region where the ROI does not occur. Secondly, although the current location of RPN in the Double Steps DL Object Detection enables robust detection performance, it may constitute inefficient learning and inference. Instead, an ROI proposal could be positioned in front of the convolution layers to significantly reduce the network size as well as its computational effort.

SUMMARY OF THE DISCLOSURE

Accordingly, the disclosure is directed to an object detection method using a CNN model, and an object detection apparatus using the same method.

In one of the exemplary embodiments, the disclosure is directed to an object detection method using a CNN model, the method would include not limited to: generating, by using a sensor, a sensor data; processing the sensor data by using a first object detection algorithm to generate a first object detection result, wherein the first object detection result includes bounding box information; processing the first object detection result by using a plurality of stages of sparse update mapping algorithm according to the bounding box information to generate a plurality of stages of updated first object detection result in the CNN model; processing a first stage of the stages of updated first object detection result by using a plurality of stages of spatial pooling algorithm to reduce the spatial dimensions of the stages of updated first object detection result between each of stages of sparse update mapping algorithm; executing a plurality of stages of deep convolution layer algorithm to correspondingly extract a plurality of feature results based on the stages of updated first object detection result in the CNN model; and performing a detection prediction based on a last-stage feature result generated by a last stage of the stages of deep convolution layer algorithm.

In one of the exemplary embodiments, the disclosure is directed to a object detection apparatus which would include not limited to: a sensor for generating a sensor data; and a processor coupled to the sensor and configured at least for: processing the sensor data by using a first object detection algorithm to generate a first object detection result, wherein the first object detection result includes bounding box information; processing the first object detection result by using a plurality of stages of sparse update mapping algorithm according to the bounding box information to generate a plurality of stages of updated first object detection result in the CNN model; processing a first stage of the stages of updated first object detection result by using a plurality of stages of spatial pooling algorithm to reduce the spatial dimensions of the stages of updated first object detection result between each of stages of sparse update mapping algorithm; executing a plurality of stages of deep convolution layer algorithm to correspondingly extract a plurality of feature results based on the stages of updated first object detection result in the CNN model; and performing a detection prediction based on a last-stage feature result generated by a last stage of the stages of deep convolution layer algorithm.

In order to make the aforementioned merits and advantages of the disclosure comprehensible, exemplary embodiments accompanied with figures are described in detail below. It is to be understood that both the foregoing general description and the following detailed description are exemplary and are intended to provide further explanation of the disclosure as claimed.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
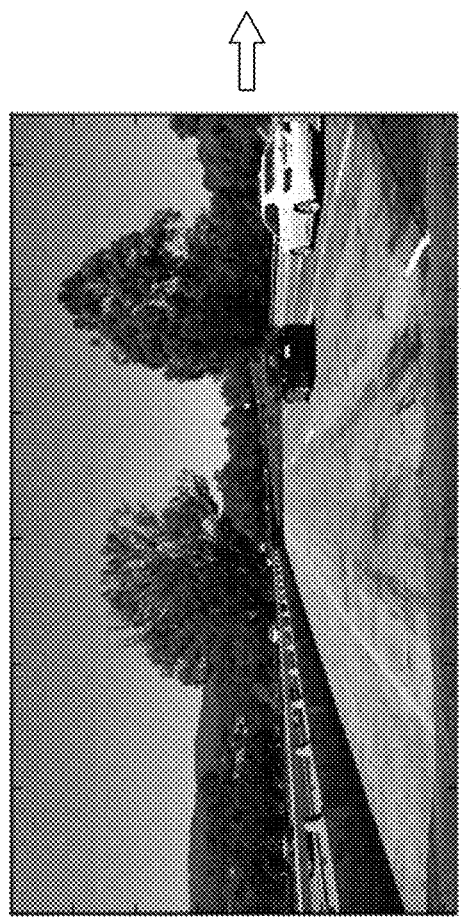
FIG. 1 illustrates the proposed regions of interest from the region proposal network (RPN) based on the extracted feature map.
Figure 1:
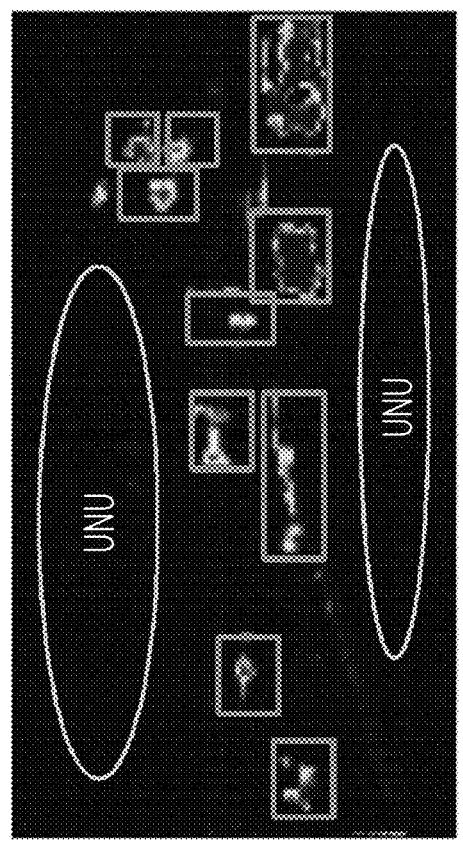

Reference will now be made in details to the present exemplary embodiments of the disclosure, examples of which are illustrated in the accompanying drawings. Wherever possible, the same reference numbers are used in the drawings and the description to refer to the same or like parts.

The disclosure provides a framework for an autonomous vehicle to detect imminent objects of a designated field of view (FOV) of an autonomous vehicle, and the framework is to be explained from the perspective of an object detection apparatus, an autonomous vehicle that uses the object detection apparatus, and an object detection method. The apparatus could be disposed within an autonomous vehicle which would operate automatically without any human intervention and thus detecting the objects of the designated FOV of vehicle to perform calculating and determining a road condition would be paramount. The apparatus would include not limited to multiple sets of different sensing devices with overlapping FOVs such as a set of imaging devices having one or more image sensors for acquiring two dimensional (2D) RGB data from the surroundings and a processing unit configured at least to execute a first object detection algorithm, a plurality of stages of sparse update mapping algorithm, a plurality of stages of spatial pooling algorithm, and a plurality of stages of deep convolution layer algorithm for each of sensor to generate a feature result to perform a detection prediction. Through the provided framework, the feature result could be extracted to perform the detection prediction so as to improve an instantaneous calculating speed and reduce unnecessary amount of data. FIG. 2~FIG. 9 elucidates the provided object detection framework with further details.

Figure 2:
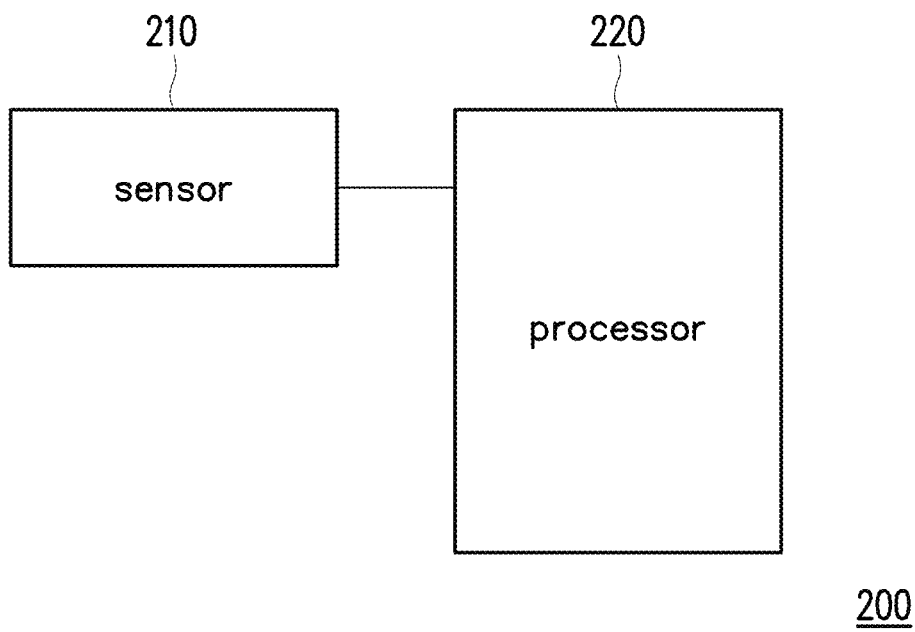
FIG. 2 illustrates a hardware block diagram of an object detection apparatus in accordance with one of the exemplary embodiments of the disclosure.

FIG. 2 illustrates a hardware block diagram of an object detection apparatus in accordance with one of the exemplary embodiments of the disclosure. The object detection apparatus 200 would include not limited to a sensor 210 and a processor 220. The sensor 210 could be an imaging sensor such as an RGB image sensor that captures visible light within a designated FOV into a 2D image. The processor 220 would be configured at least for processing the sensor data by using a first object detection algorithm to generate a first object detection result, wherein the first object detection result includes bounding box information.

The processor 220 would then be configured for processing the first object detection result by using a plurality of stages of sparse update mapping algorithm according to the bounding box information to generate a plurality of stages of updated first object detection result in the CNN model. After that, the processor 220 would be configured for processing a first stage of the stages of updated first object detection result by using a plurality of stages of spatial pooling algorithm to reduce the spatial dimensions of the stages of updated first object detection result between each of stages of sparse update mapping algorithm.

The processor 220 would then be configured for executing a plurality of stages of deep convolution layer algorithm to correspondingly extract a plurality of feature results based on the stages of updated first object detection result in the CNN model. At last, the processor 220 would be configured for performing a detection prediction based on a last-stage feature result generated by a last stage of the stages of deep convolution layer algorithm. In this manner, this disclosure improves an instantaneous calculating speed and reduces unnecessary amount of data of calculation by a first object detection algorithm, a plurality of sparse update mapping algorithm, a plurality of spatial pooling algorithm and a plurality of stages of deep convolution layer algorithm, and because the CNN was trained properly using a robust dataset, the number of identifiable object would increase.

It is noted that in other embodiment, the object detection apparatus 200 can include a plurality of 2D imaging sensor, and the processor 220 could be used to process a plurality of sensor data, the persons skilled in the art can adaptively adjust a number of the sensor 210 according to actual situations and requirements.

Figure 3:
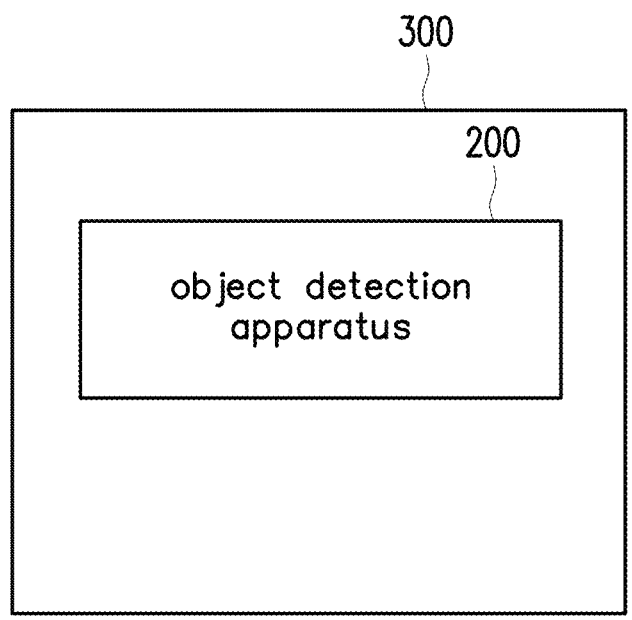
FIG. 3 illustrates an autonomous vehicle which uses an object detection apparatus in accordance with one of the exemplary embodiments of the disclosure.

FIG. 3 illustrates an autonomous vehicle which uses an object detection apparatus in accordance with one of the exemplary embodiments of the disclosure. The autonomous vehicle 300 would include not limited to the object detection apparatus 200 as shown in FIG. 2.

Figure 4:
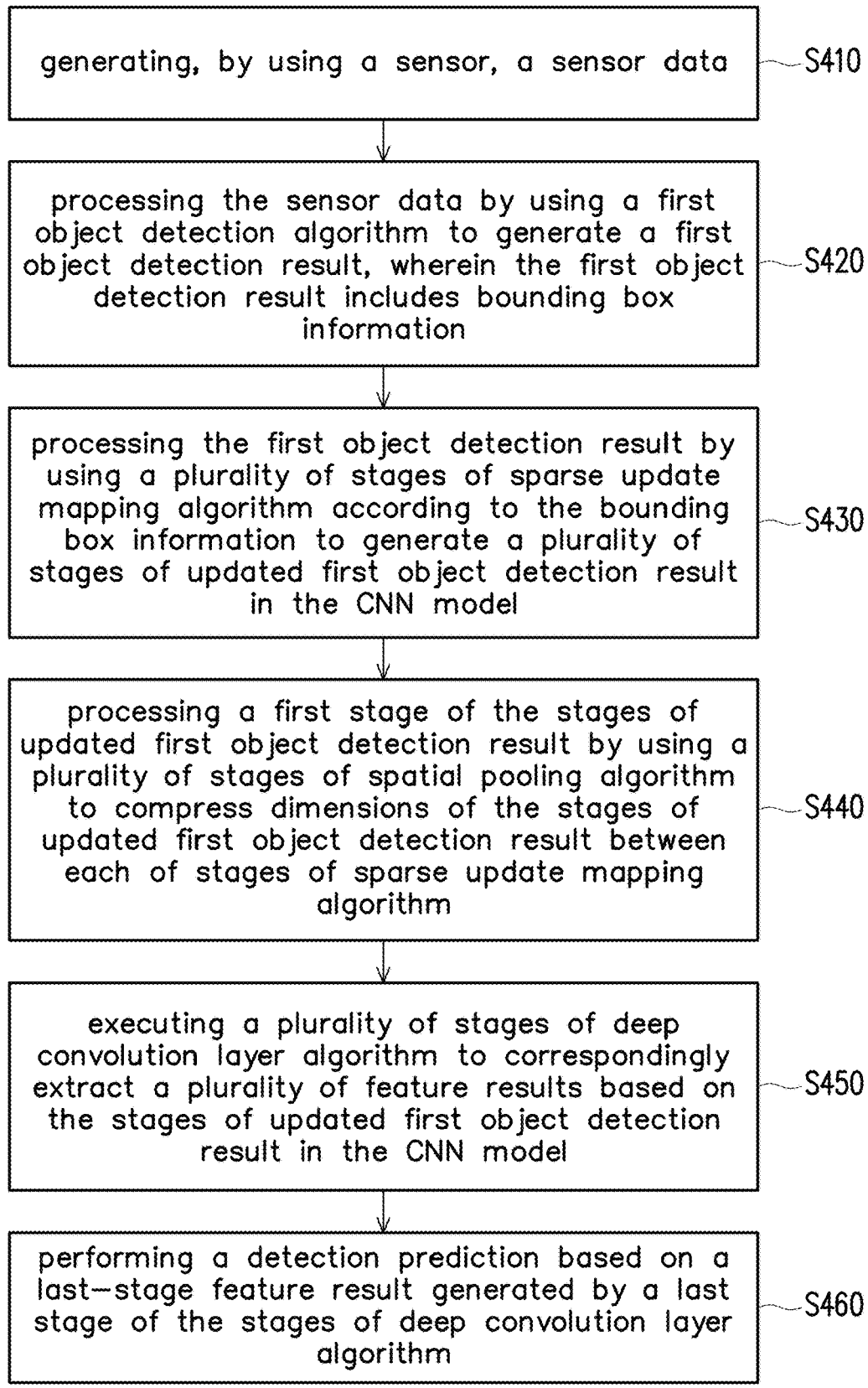
FIG. 4 is a flow chart which illustrates steps of an object detection method in accordance with one of the exemplary embodiments of the disclosure.

FIG. 4 is a flow chart which illustrates steps of an object detection method in accordance with one of the exemplary embodiments of the disclosure. In step S410, the object detection apparatus would generate, by using a sensor, a sensor data. In step S420, the object detection apparatus would process the sensor data by using a first object detection algorithm to generate a first object detection result, wherein the first object detection result includes bounding box information.

In step S430, the object detection apparatus would process the first object detection result by using a plurality of stages of sparse update mapping algorithm according to the bounding box information to generate a plurality of stages of updated first object detection result in the CNN model. In step S440, the object detection apparatus would process a first stage of the stages of updated first object detection result by using a plurality of stages of spatial pooling algorithm to reduce the spatial dimensions of the stages of updated first object detection result between each of stages of sparse update mapping algorithm. In step S450, the object detection apparatus would execute a plurality of stages of deep convolution layer algorithm to correspondingly extract a plurality of feature results based on the stages of updated first object detection result in the CNN model. At last, the object detection apparatus would perform a detection prediction based on a last-stage feature result generated by a last stage of the stages of deep convolution layer algorithm in step S460.

Figure 5:
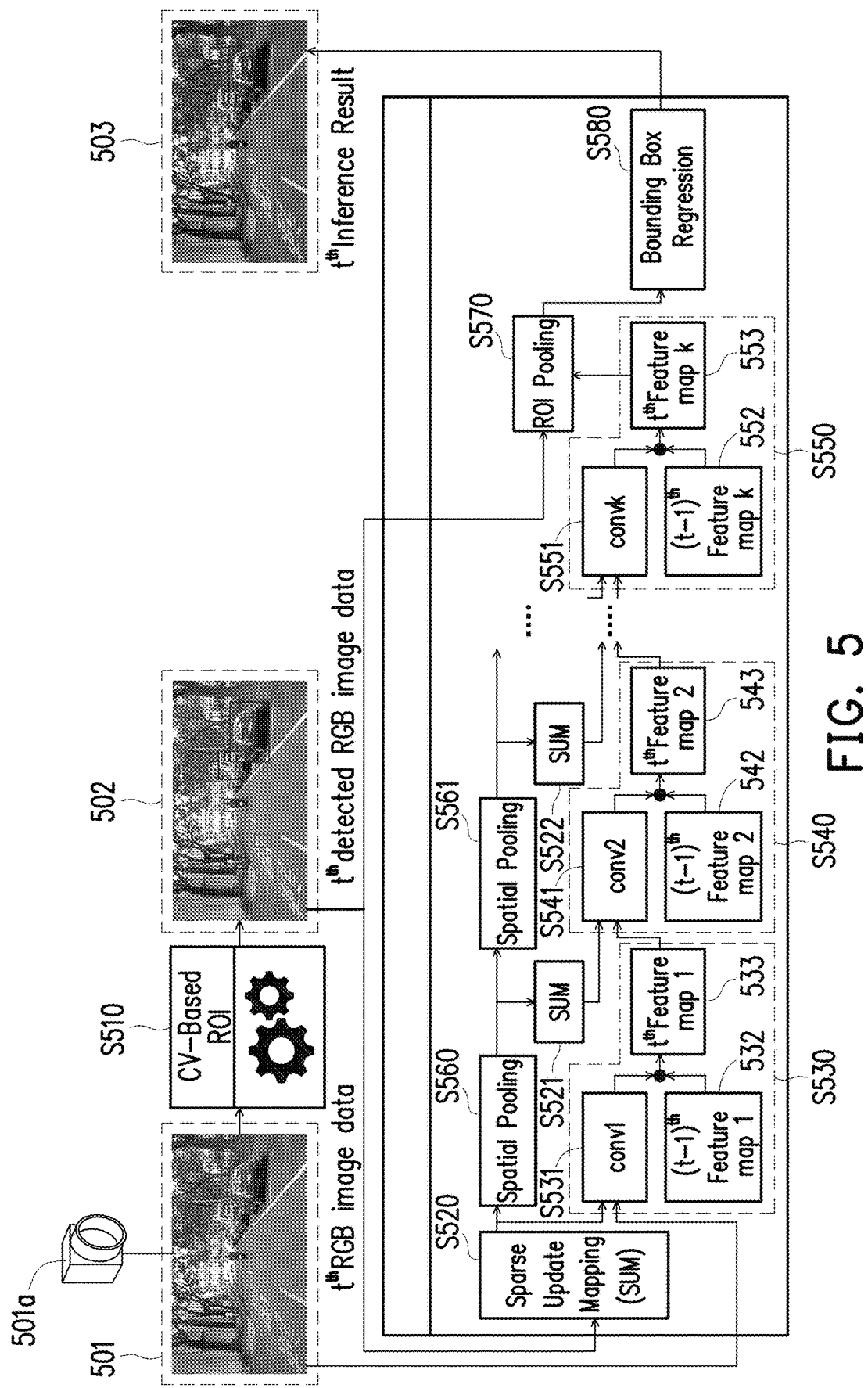
FIG. 5 illustrates a detailed block diagram of the object detection framework in accordance with one of the exemplary embodiments of the disclosure.

FIG. 5~FIG. 9 elucidates the provided object detection framework with several exemplary embodiments and examples. FIG. 5 illustrates a detailed block diagram of the object detection framework in accordance with one of the exemplary embodiments of the disclosure. In this embodiment, the multiple types of sensing devices may include a sensor (e.g. RGB camera array 501a). The RGB camera array 501a takes an image nearby the autonomous vehicle and generates a sensor data (e.g. $t^{th}$ RGB image data 501) accordingly, wherein a definition of t of the $t^{th}$ means frame index. In other words, the RGB camera array 501a may capture a plurality of frames in a plurality time points, and $t^{th}$ RGB image data 501 is a frame captured at time point t. A processor coupled to the RGB camera array 501a, and the processor configured at least for processing the $t^{th}$ RGB image data 501. At first, the processor would process the sensor data (i.e. the $t^{th}$ RGB image data 501) by using a first object detection algorithm (e.g. CV-Based ROI step S510 illustrated in FIG. 5) to generate a first object detection result (i.e. $t^{th}$ detected RGB image data 502), wherein the $t^{th}$ detected RGB image data 502 includes bounding box information. Then, the processor would process the first object detection result (i.e. $t^{th}$ detected RGB image data 502) and the sensor data (i.e. the $t^{th}$ RGB image data 501) in a CNN model, wherein the CNN model is, for example, a Faster R-CNN algorithm as taught by S. Ren et al., "*Faster R-CNN: Towards Real-time Object Detection with Region Proposal Networks*," CoRR, vol. abs/1506.01497, 2016.

In the detailed description, the processor would then process the first object detection result by using a plurality of stages of sparse update mapping (SUM) algorithm (i.e. SUM algorithm step S520, S521, S522) according to the bounding box information to generate a plurality of stages of updated first object detection result, and the processor would process a first stage of the stages of updated first object detection result by using a plurality of stages of spatial pooling algorithm (i.e. spatial pooling algorithm step S560, S561) to reduce the spatial dimensions of the first stage of the stages of updated first object detection result between each of stages of sparse update mapping algorithm. The processor would execute a plurality of stages of deep convolution layer algorithm (i.e. deep convolution layer algorithm step S530, S540, S550) to correspondingly extract a plurality of feature results (i.e. $t^{th}$ Feature map 1 533, $t^{th}$ Feature map 2 543, $t^{th}$ Feature map k 553) based on the stages of updated first object detection result, wherein each of the stages of deep convolution layer algorithm includes convolution algorithm (i.e. convolution algorithm step S531, S541, S551). After that, the processor would execute a region of interest (ROI) pooling algorithm (i.e. ROI Pooling algorithm step S570) and a bounding box regression algorithm (i.e. Bounding Box Regression algorithm step S580) to perform a detection prediction (i.e. $t^{th}$ Inference Result 503) based on a last-stage feature result generated by a last stage of the stages of deep convolution layer algorithm (i.e. deep convolution layer algorithm step S550).

Figure 6:
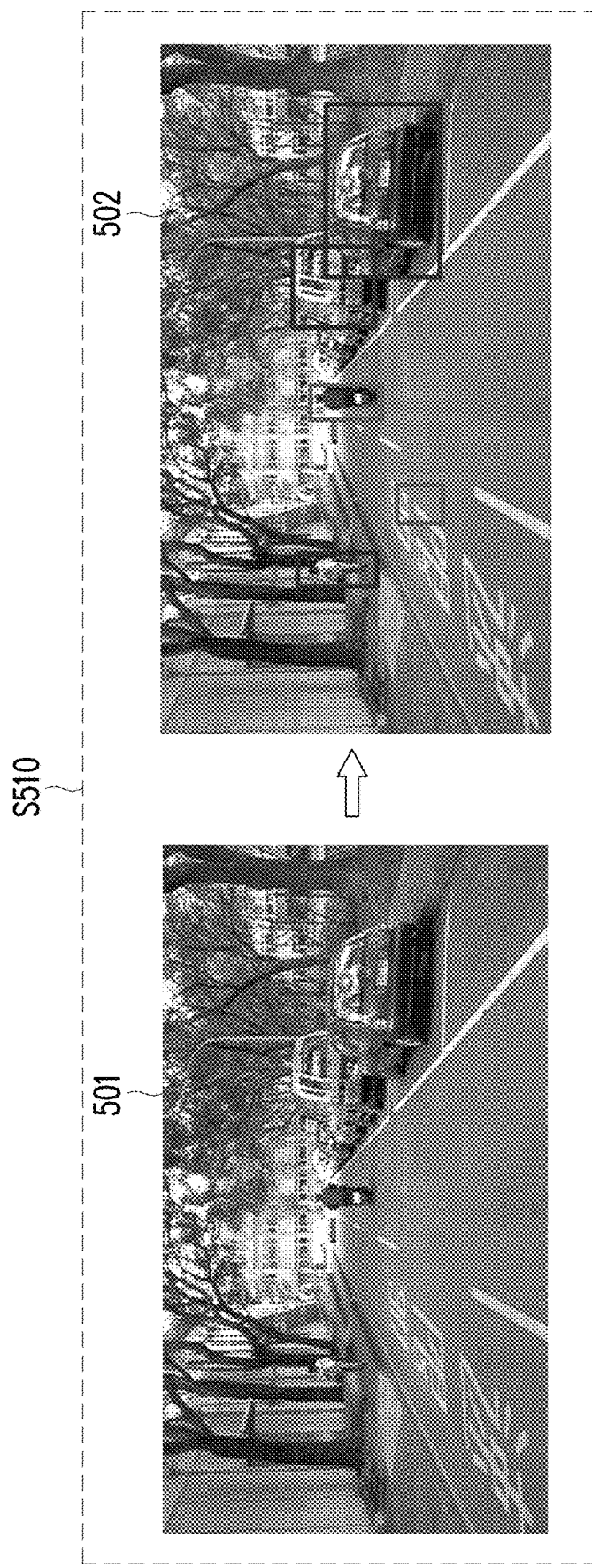
FIG. 6 illustrates a first object detection algorithm in accordance with one of the exemplary embodiments of the disclosure.

To be more specific, FIG. 6 illustrates a first object detection algorithm in accordance with one of the exemplary embodiments of the disclosure. With reference to FIG. 5 and FIG. 6, the processor would process the $t^{th}$ RGB image data 501 by using the first object detection algorithm (i.e. CV-Based ROI step S510 illustrated in FIG. 5 and FIG. 6) to generate a first object detection result (e.g. the $t^{th}$ detected RGB image data 502), wherein the $t^{th}$ detected RGB image data 502 includes bounding box information. In detail, the processor would detect the $t^{th}$ RGB image data 501 to find regions of interest (ROI) (e.g. the bounding boxes as illustrated in the $t^{th}$ detected RGB image data 502) based on a computer vision (CV), wherein the ROI include not limited people, vehicle, and any obstacle in front of the object detection apparatus. After that, the processor would generate the bounding box information according to the ROI, wherein the bounding box information includes coordinate information of the bounding boxes, for example, the coordinate of four corner points of the bounding boxes. It is noted that, the first object detection algorithm in this embodiment may use any kind of object detection algorithm that could be computed efficiently with no regards to detection performance (e.g. the false positive rate) for detecting the bounding boxes.

Figure 7:
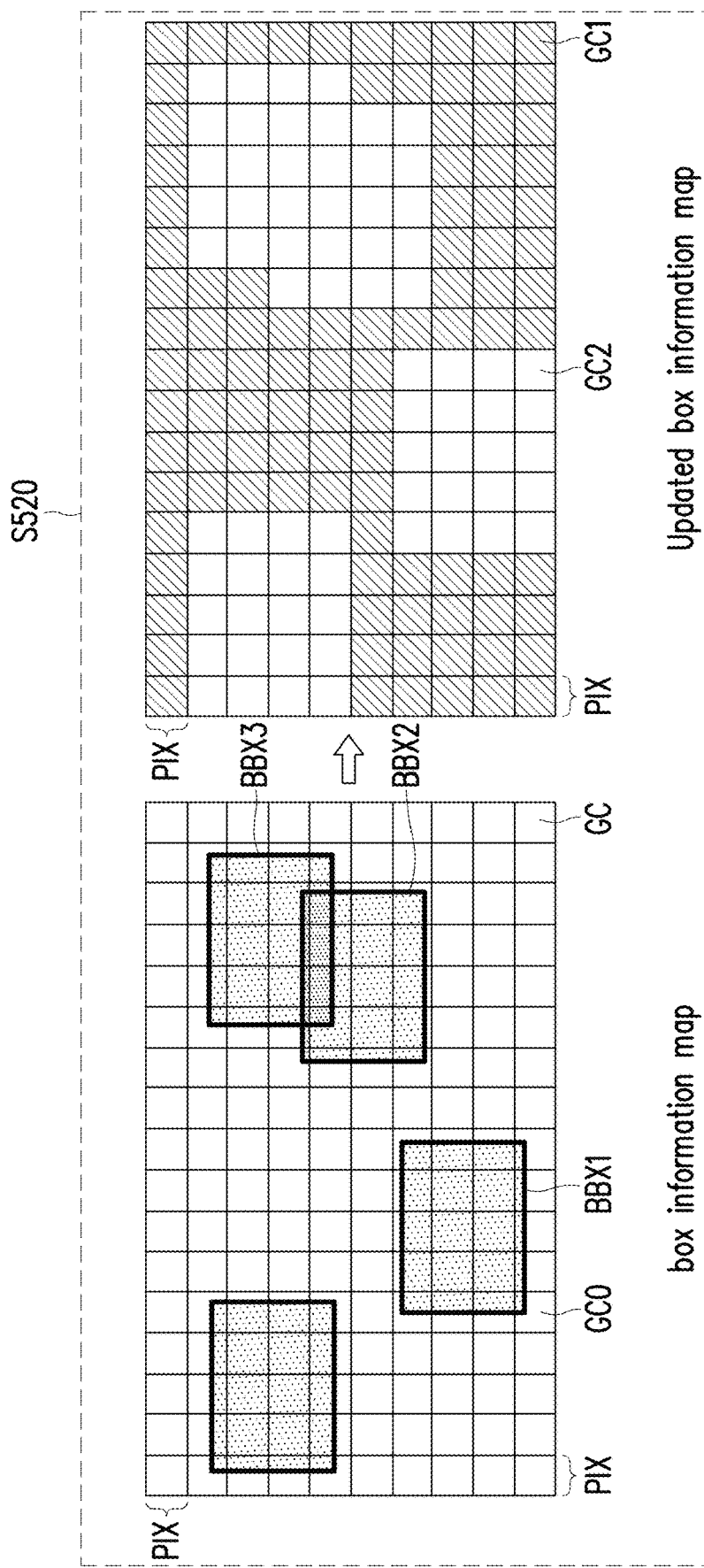
FIG. 7 illustrates each of a plurality of stages of sparse update mapping algorithm in accordance with one of the exemplary embodiments of the disclosure.

After that, FIG. 7 illustrates each of a plurality of stages of sparse update mapping algorithm in accordance with one of the exemplary embodiments of the disclosure. With reference to FIG. 5 and FIG. 7, the processor would process the first object detection result (i.e. the $t^{th}$ detected RGB image data 502) by using a plurality of stages of sparse update mapping algorithm to generate a plurality of stages of updated first object detection result according to the bounding box information in the CNN model. For example, in a first stage of the stages of sparse update mapping algorithm (i.e. SUM algorithm step S520 illustrated in FIG. 5 and FIG. 7), the processor would generate a box information map with a plurality of bounding boxes (e.g. bounding box BBX1, BBX2, BBX3 illustrated in FIG. 7) as the updated first object detection result (e.g. updated box information map illustrated in FIG. 7) by mapping the bounding box information to the box information map (e.g. box information map illustrated in FIG. 7).

In detail, the box information map comprised by a plurality of grid cells (e.g. grid cell GC, GC0) and the updated box information map also comprised by a plurality of grid cells (e.g. grid cell GC1, GC2), wherein a length of each of grid cells is 1 pixel PIX and a width of each of grid cells is 1 pixel PIX, and numbers of grid cells in the box information map are the same as numbers of pixels in the sensor data. For example, the length of the box information map is 17 pixels PIX and the width of the box information map is 10 pixels PIX, so the size of the box information map (i.e. numbers of grid cells of the box information map) is 170 grid cells, and the numbers of grid cells of the sensor data also comprised by 170 grid cells in this embodiment. It is noted, FIG. 7 is merely an example, and the numbers of grid cells of the box information map no limitations to the present disclosure.

In addition, after mapping the bounding box information to the box information map, the processor would check whether the grid cells and the bounding boxes are aligned or not. If the grid cells and the bounding boxes are not aligned, the processor would set the grid cells (e.g. grid cell GC0) overlapped with the bounding boxes (e.g. bounding box BBX1) as a first number region. On the other hand, the processor would set the grid cells (e.g. grid cell GC) without the bounding boxes as a second number region. The processor would also combine any set of the bounding boxes that are spatially overlapping (e.g. bounding box BBX2 and bounding box BBX3) as a singular collection of overlapping bounding boxes. After that, the processor would set a value of the first number region as a first index (e.g. number 1 of binary number) and setting a value of the second number region as a second index (e.g. number 0 of binary number). In other words, the processor would set a true value (i.e. number 1 of binary number) as the values of grid cells inside (or overlapped with) the bounding boxes and the singular collection of overlapping bounding boxes, and set a false value (i.e. number 0 of binary number) as the values of grid cells out of the bounding boxes and the singular collection of overlapping bounding boxes. Accordingly, the processor would know the values of grid cells with the true value is regions that needed to be updated. It is noted, in this exemplary embodiment, the first index and the second index are binary number, but no more limitation here. In this manner, the processor would generate the updated first object detection result (i.e. updated box information map illustrated in FIG. 7).

Figure 8A:
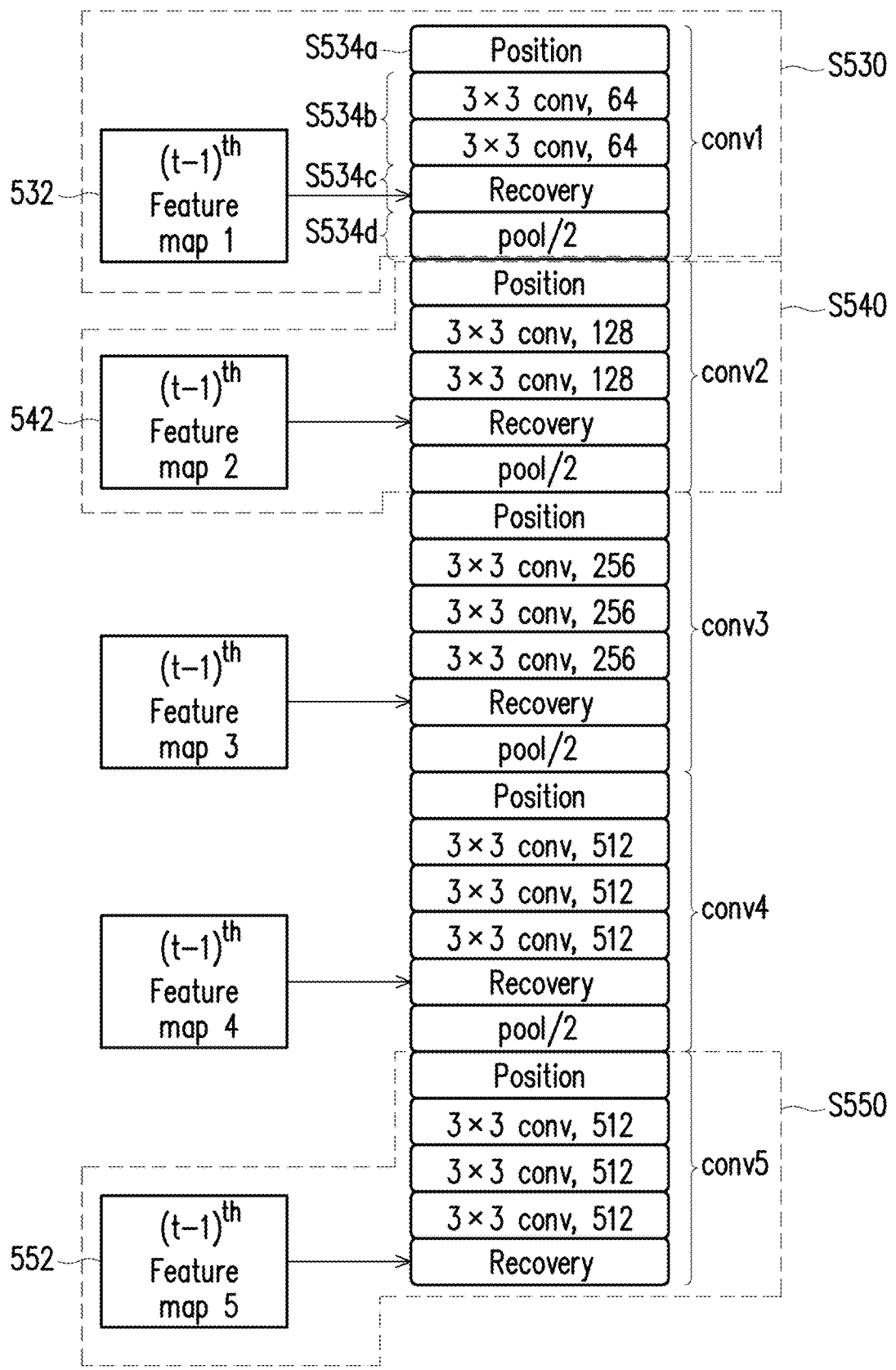
FIG. 8A~FIG. 8F illustrates each of a plurality of stages of deep convolution layer algorithm in accordance with one of the exemplary embodiments of the disclosure.

FIG. 8A~FIG. 8E illustrates each of a plurality of stages of deep convolution layer algorithm in accordance with one of the exemplary embodiments of the disclosure. FIG. 8A illustrates a detailed framework of each of a plurality of stages of deep convolution layer algorithm in accordance with one of the exemplary embodiments of the disclosure. With reference to FIG. 5 and FIG. 8A, the processor would execute 5 stages of deep convolution layer algorithm (e.g. the stages of deep convolution layer algorithm step S530, S540 to S550 as illustrated in FIG. 8A) to correspondingly extract a plurality of feature results based on the stages of updated first object detection result in the CNN model. It is noticed that the processor would execute 5 stages of deep convolution layer algorithm as an exemplary embodiment, but this present disclosure does not limit numbers of stages of deep convolution layer algorithm, FIG. 8A is merely an example, and constructs no limitations to the present disclosure. In other embodiment, the processor could execute k stages of deep convolution layer algorithm, wherein k is positive integer.

In detail to description, in each of the stages of deep convolution layer algorithm, the processor would process a pre-stage updated first object detection result of the stages of updated first object detection result based on a pre-stage feature result of the feature results by using a position layer algorithm to generate a strip feature map (i.e. the position layer algorithm step S534a of the convolution algorithm step S531), process the strip feature map by using a convolution layer algorithm to generate a convoluted strip feature map (i.e. the convolution layer algorithm step S534b of the convolution algorithm step S531), process the convoluted strip feature map based on a prior-time feature result (e.g. $(t-1)^{th}$ Feature map 1 532, $(t-1)^{th}$ Feature map 2 542, $(t-1)^{th}$ Feature map 3, $(t-1)^{th}$ Feature map 4, and $(t-1)^{th}$ Feature map 5 552 illustrated in FIG. 5 and FIG. 8A) from an earlier time point of the stages of deep convolution layer algorithm by using a recovery layer algorithm (i.e. the recovery layer algorithm step S534c of the convolution algorithm step S531) to generate the feature result (e.g. $t^{th}$ Feature map 1 533, $t^{th}$ Feature map 2 543, and $t^{th}$ Feature map 3 553 illustrated in FIG. 5), wherein a time point (t−1) is earlier than a time point t.

The processor would then process the feature result by using a pooling layer algorithm to reduce the spatial dimensions of the feature result (i.e. the pooling layer algorithm step S534d of the convolution algorithm step S531). In other word, each of convolution algorithms (e.g. convolution algorithm conv1, conv2, conv3, conv4, conv5, and convk) comprises a position layer algorithm, a convolution layer algorithm, a recovery layer algorithm, and a pooling layer algorithm. With a mention, the filters of each of the stages of deep convolution layer algorithm be increased so as to find more detail part at the backward stages, for example, 64 filters in convolution algorithm conv1, 128 filters in convolution algorithm conv2, 256 filters in convolution algorithm conv3, 512 filters in convolution algorithm conv4, and 512 filters in convolution algorithm conv5, and no more limitation here. It is noticed, these configurations may change depending on the desired design of network architecture, no limitations to the present disclosure.

For instance, a description of a first stage of the stages of deep convolution layer algorithm step S530 as an exemplary embodiment, the processor would receive the updated first object detection result (i.e. updated box information map illustrated in FIG. 7) as the pre-stage updated first object detection result and receive the sensor data (i.e. the $t^{th}$ RGB image data 501) as the pre-stage feature result, and the processor would then process the updated box information map based on the $t^{th}$ RGB image data 501 by using a first stage of the stages of deep convolution layer algorithm.

After that, in a second stage of the stages of deep convolution layer algorithm step S540, the processor would receive the updated first object detection result from the second stage of the stages of sparse update mapping algorithm S521 as the pre-stage updated first object detection result, and receive the feature result 533 from the first stage of the stages of deep convolution layer algorithm step S530 as the pre-stage feature result, and the processor would then process the updated first object detection result from the second stage of the stages of sparse update mapping algorithm S521 based on the feature result 533 by using a second stage of the stages of deep convolution layer algorithm S540, and so on to execute a third stage of the stages of deep convolution layer algorithm, a fourth stage of the stages of deep convolution layer algorithm step and a last stage of the stages of deep convolution layer algorithm S550.

Figure 8B:
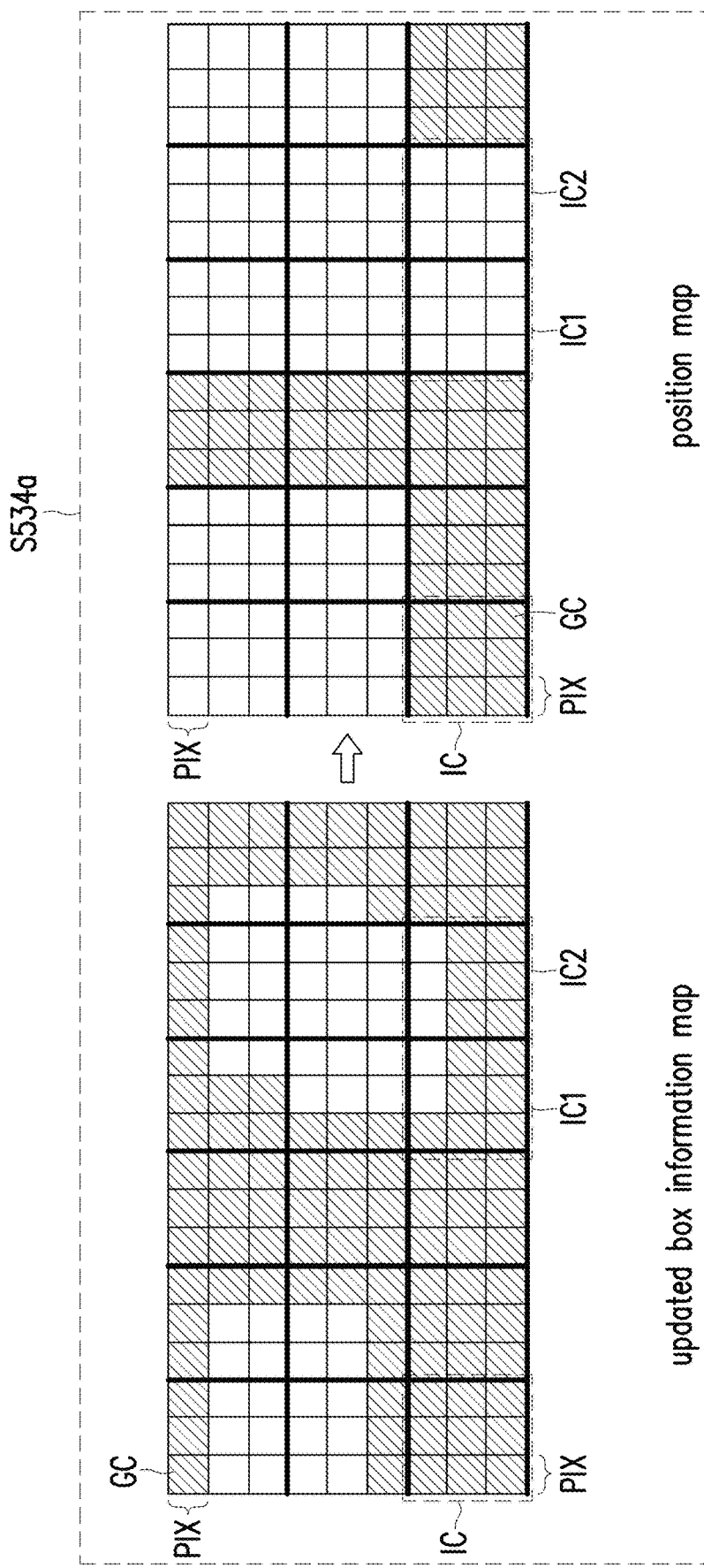
Figure 8C:
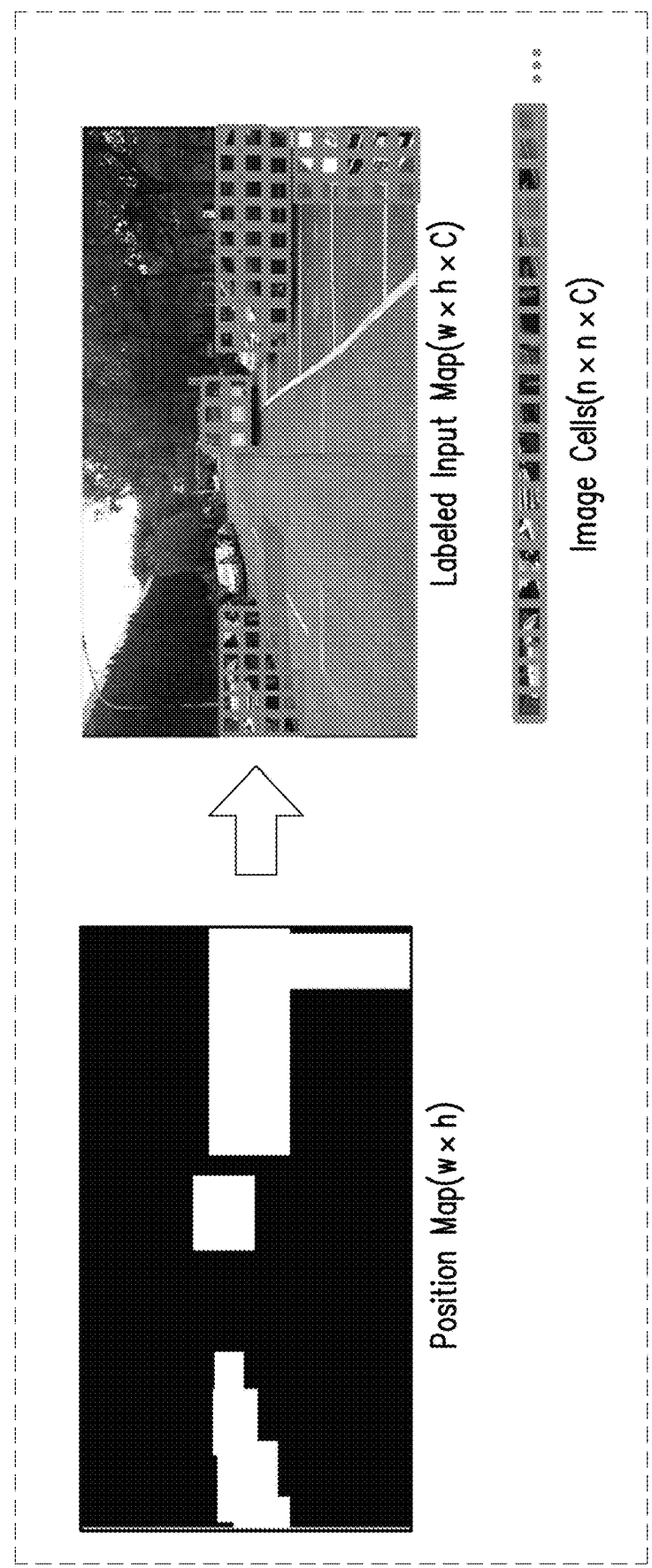

To be more specific, FIG. 8B~FIG. 8C illustrates each of a plurality of stages of position layer algorithm in accordance with one of the exemplary embodiments of the disclosure. With reference to FIG. 5, FIG. 8A and FIG. 8B~FIG. 8C, the position layer algorithm comprises: receiving the pre-stage updated first object detection result and the pre-stage feature result, dividing the pre-stage updated first object detection result based on the pre-stage feature result to generate a position map with a plurality of image regions, wherein each of the image regions assembled by N*N grid cells and N is a positive integer, setting a value of the image regions overlapped with the first number region as the first index, and convoluting the position map to the strip feature map.

In detail to description, a position layer algorithm step S534a of the first stage of the stages of deep convolution layer algorithm step S530 is taken as an exemplary embodiment for explanation, the processor would receive the updated first object detection result (i.e. the updated box information map illustrated in FIG. 8B) as the pre-stage updated first object detection result and receive the sensor data (i.e. the $t^{th}$ RGB image data 501) as the pre-stage feature result. Then, the processor would divide the updated box information map based on the $t^{th}$ RGB image data 501 to generate a position map (as illustrated in FIG. 8B) with a plurality of image regions (e.g. image region IC), wherein each of image regions assembled by 3*3 grid cells (e.g. assembled by 9 grid cells). Next, the processor would set a value of the image regions (e.g. image region IC1 and IC2) overlapped with the first number region as the first index. In this manner, a way that divide the updated box information map to generate the image regions improve the calculating efficiency, since the calculating way of block (e.g. 3*3 grid cells) type is more suitable for the deep convolution layer algorithm.

The processor would identify the position map (i.e. the position map (w×h)) as the strip feature map (i.e. image cells (n×n×C) illustrated in FIG. 8C). To be more specific, the position map (w×h) is the real result of this embodiment by using the position layer algorithm to process the $t^{th}$ RGB image data 501. The processor would then label the image regions on the position map (w×h) (i.e. Labeled Input Map (w×h×C)). After that, the processor would convolute the position map (w×h) to the image cells (n×n×C), wherein data of the image cells (n×n×C) includes C image regions and each of the C image regions comprised by 3*3 grid cells. In this manner, a way that convolute the position map to the strip feature map is suitable for executing the convolution layer algorithm.

Figure 8D:
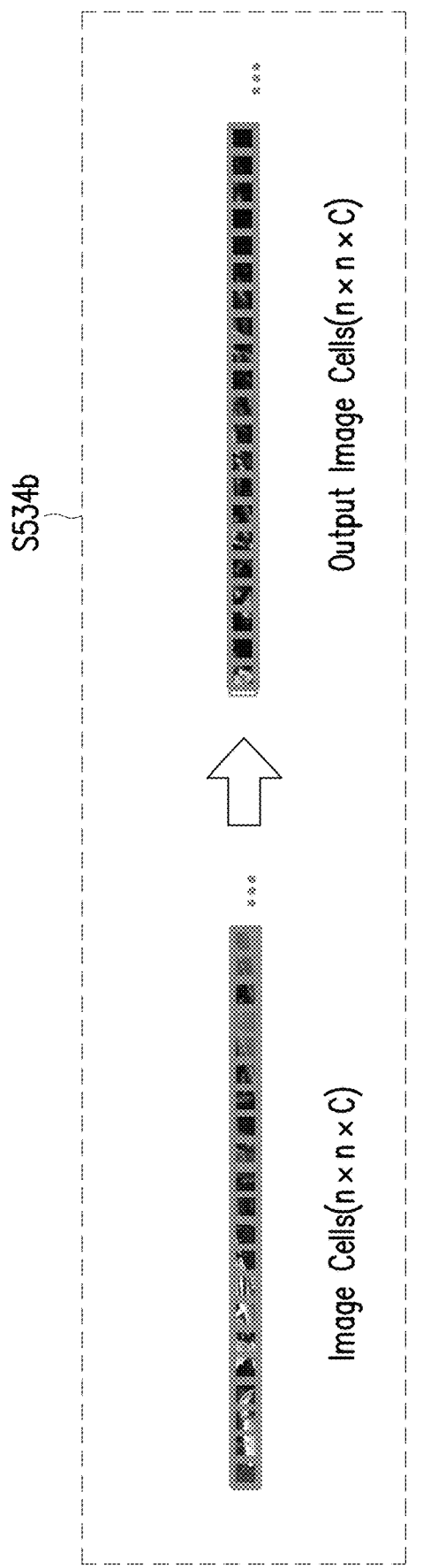

FIG. 8D illustrates each of a plurality of stages of convolution layer algorithm in accordance with one of the exemplary embodiments of the disclosure. With reference to FIG. 5, FIG. 8A and FIG. 8D, the convolution layer algorithm comprises: convoluting the strip feature map to generate a convoluted strip feature map. In detail, a convolution layer algorithm step S534b of the first stage of the stages of deep convolution layer algorithm step S530 is taken as an exemplary embodiment for explanation, the processor would convolute the strip feature map (i.e. the image cells (n×n×C)) to generate a convoluted strip feature map (i.e. output image cells (n×n×C)). It is noted that, the convolution layer algorithm in this embodiment may use any kinds of convolution layer algorithm that could be computed efficiently for extracting the feature map from the input image data.

Figure 8E:
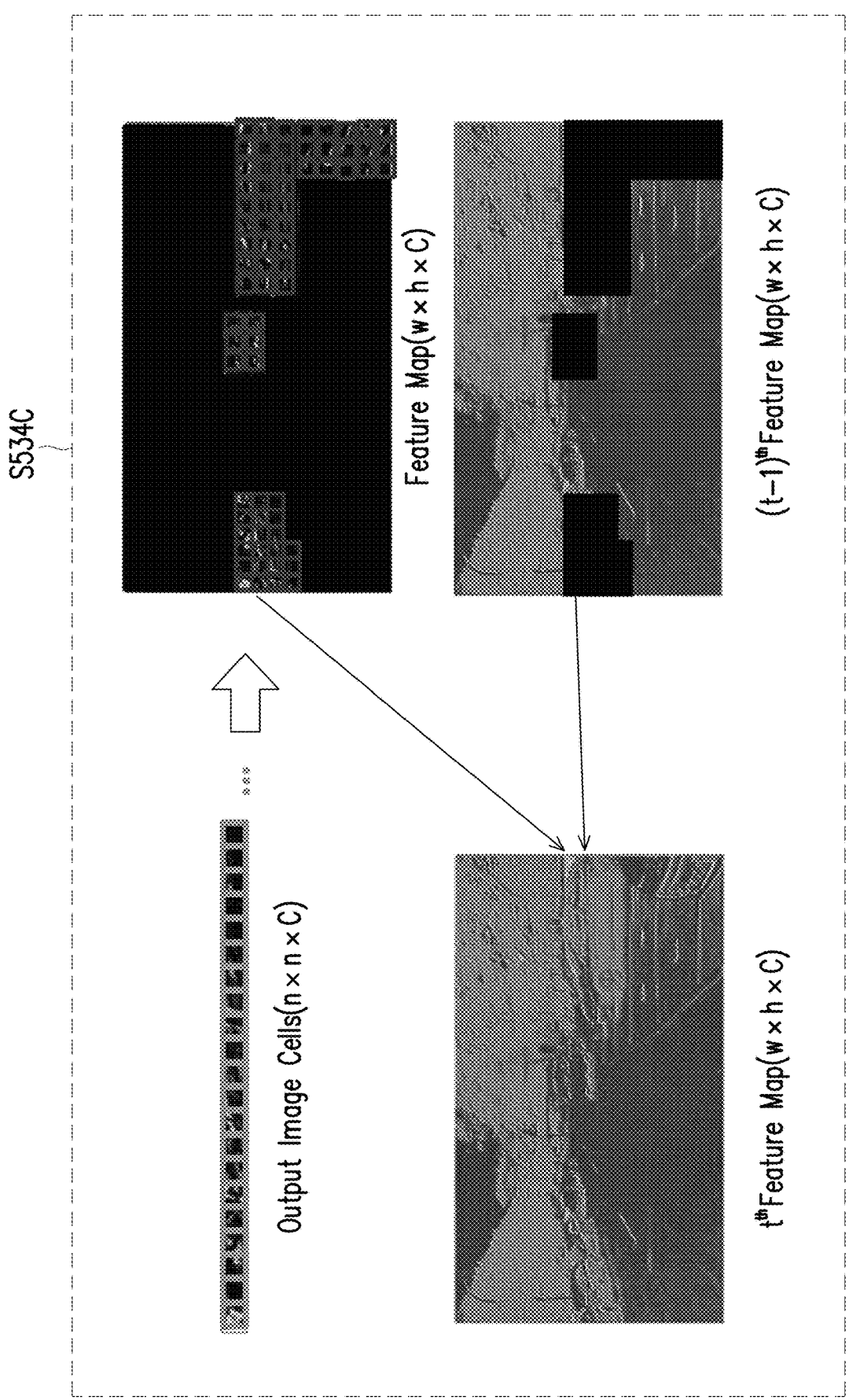

FIG. 8E illustrates each of a plurality of stages of recovery layer algorithm in accordance with one of the exemplary embodiments of the disclosure. With reference to FIG. 5, FIG. 8A and FIG. 8E, the recovery layer algorithm comprises: receiving the convoluted strip feature map and operating the convoluted strip feature map and the prior-time feature result to generate the feature result. To be more specific, a recovery layer algorithm step S534c of the first stage of the stages of deep convolution layer algorithm step S530 is taken as an exemplary embodiment for explanation, the processor would receive the convoluted strip feature map (i.e. output image cells (n×n×C)) and recovery the convoluted strip feature map to a feature map (i.e. Feature Map (w×h×C)) according to the position map (w×h) (as illustrated in FIG. 8C). In detail, the data of output image cells (n×n×C) does not include position information on the original data (i.e. the $t^{th}$ RGB image data 501 illustrated in FIG. 5), so it should be inversed to the position map with feature map (i.e. Feature Map (w×h×C)). The processor would then operate the Feature Map (w×h×C) and the prior-time feature result (e.g. the $(t-1)^{th}$ Feature Map (w×h×C) illustrated in FIG. 8E) to generate the feature result (i.e. $t^{th}$ Feature Map (w×n×C)), wherein the operation of the generation of the feature result (i.e. $t^{th}$ Feature Map (w×n×C)) is, for example, a XOR operation.

Figure 8F:
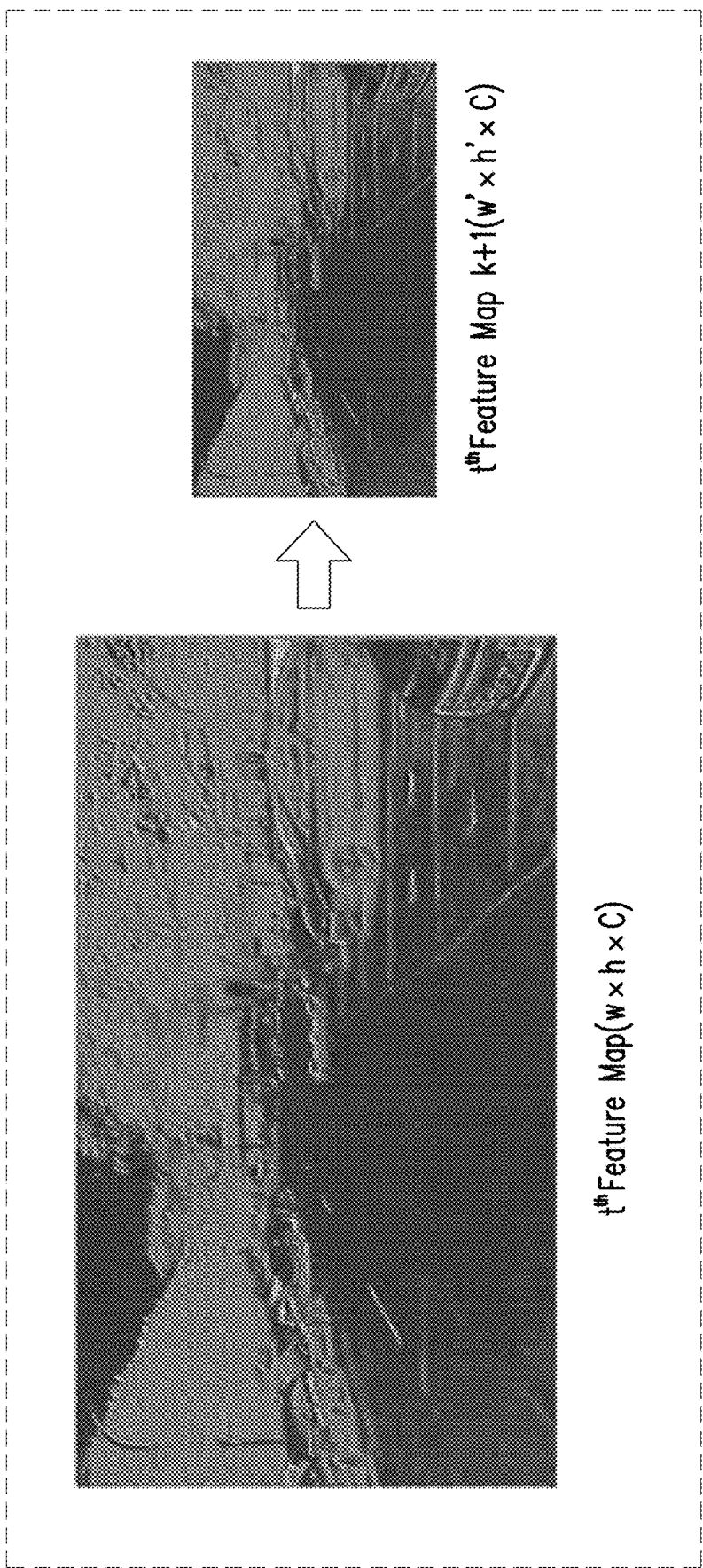

FIG. 8F illustrates each of a plurality of stages of pooling layer algorithm in accordance with one of the exemplary embodiments of the disclosure. With reference to FIG. 5, FIG. 8A and FIG. 8F, the processor would execute the pooling layer algorithm to reduce the spatial dimensions of the feature result so as to obtain more contextual features from the input feature result (i.e. the feature result originated from the prior layer). To be more specific, a pooling layer algorithm step S534d of the first stage of the stages of deep convolution layer algorithm step S530 is taken as an exemplary embodiment for explanation. The processor would reduce the spatial dimensions of the feature result (i.e. the $t^{th}$ Feature Map (w×h×C) illustrated in FIG. 8F) to become a spatially-reduced feature result (i.e. the $t^{th}$ Feature Map k+1 (w×n×C) illustrated in FIG. 8F), wherein position information of the $t^{th}$ Feature Map (w'×h'×C) are the same as position information of the $t^{th}$ Feature Map k+1 (w'×h'×C), and a dimension of the $t^{th}$ Feature Map (w'×h'×C) are larger than a dimension of the $t^{th}$ Feature Map k+1 (w'×h'×C). In this manner, the dimension of the feature result could be reduced by using the pooling layer algorithm, so as to reduce amount of data of calculation.

In other word, the processor would execute the position layer algorithm before the convolution layer algorithm and execute the recovery layer algorithm after the convolution layer algorithm (e.g. a first stage of the stages of deep convolution layer algorithm step S530 as illustrated in FIG. 8A) and so on to execute a second stage of the stages of deep convolution layer algorithm step S540 to a last stage of the stages of deep convolution layer algorithm step S550.

Figure 9:
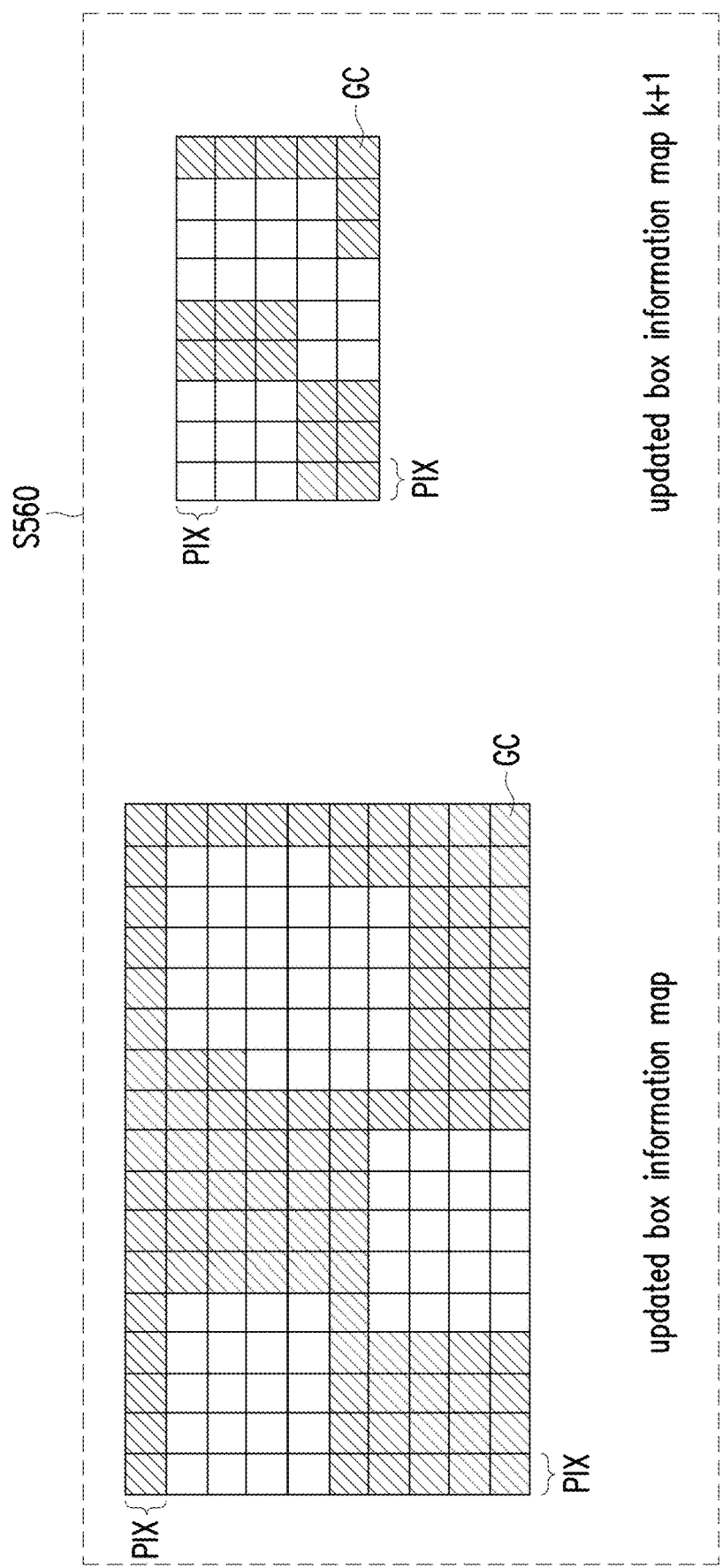
FIG. 9 illustrates each of a plurality of stages of spatial pooling algorithm in accordance with one of the exemplary embodiments of the disclosure.

On the other hand, the processor would process a first stage of the stages of updated first object detection result by using a plurality of stages of spatial pooling algorithm to reduce the spatial dimensions of the stages of updated first object detection result between each of stages of sparse update mapping algorithm. To be more specific, FIG. 9 illustrates each of a plurality of stages of spatial pooling algorithm in accordance with one of the exemplary embodiments of the disclosure. With reference to FIG. 5 and FIG. 9, between each of stages of sparse update mapping algorithm, the processor would reduce the spatial dimensions of the first stage of the stages of updated first object detection result (i.e. updated box information map illustrated in FIG. 7 and FIG. 9), so as to correspondingly match the dimension of each of the feature results. In detail, for example, the processor would reduce the spatial dimensions of the updated first object detection result generated by SUM algorithm step S520 to maintain a position information of the updated box information map and change the dimension of the updated first object detection result (i.e. updated box information map k+1 illustrated in FIG. 9). Accordingly, the dimension of the updated box information map k+1 is the same as the dimension of $(t-1)^{th}$ Feature map2 542. The processor would then process the updated box information map k+1 by using SUM algorithm step S521 to generate a second stage of the stages of updated first object detection result as the input data of deep convolution layer algorithm step S540 and so on to execute next steps. It is noticed, a processing method of the spatial pooling algorithm and a processing method of the pooling layer algorithm are different, the processing method of the pooling layer algorithm is processing a floating-point number of the feature result, and the processing method of the spatial pooling algorithm is processing the binary number of the updated first object detection result.

At last, the processor would execute a region of interest (ROI) pooling algorithm (i.e. ROI pooling algorithm step S570) and a bounding box regression algorithm (i.e. bounding box regression algorithm step S580) to perform a detection prediction (i.e. $t^{th}$ Inference Result 503) based on a last-stage feature result generated by a last stage of the stages of deep convolution layer algorithm. In detail to description, the processor would provide an interface of an indefinite range of the bounding boxes and a fully connected layer spatially interconnected, so that the network architecture can share the last layer of convolution features (i.e. the last-stage feature result) and make a final prediction result (i.e. the detection prediction) in the ROI pooling algorithm step S570, and the processor would then quantify which category the confidence prediction for each ROI is most likely to belong to and the regression bounding box values to bring them closer to the object and as a final output (i.e. $t^{th}$ Inference Result 503).

In this manner, this disclosure removes the unnecessary calculating region (i.e. the second number region) of updated first object detection result based on a premise of high predictive accuracy by using a first object detection algorithm, a plurality of stages of sparse update mapping algorithm, a plurality of stages of spatial pooling algorithm, and a plurality of stages of deep convolution layer algorithm to improve an instantaneous calculating speed and reduces unnecessary amount of data of calculation.

Figure 10:
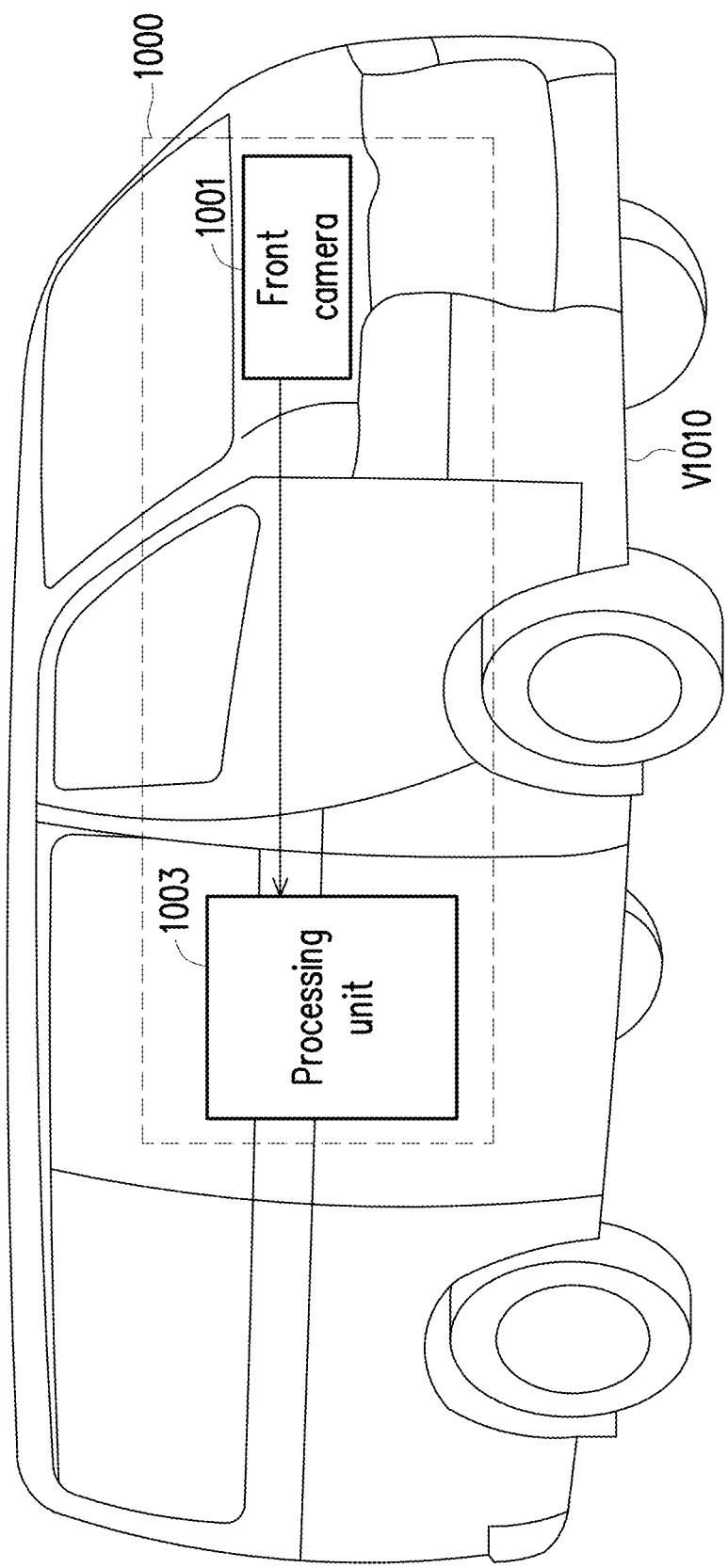
FIG. 10 illustrates another implementation example of the object detection method in accordance with one of the exemplary embodiments of the disclosure.

FIG. 10 illustrates another implementation example of the object detection method in accordance with one of the exemplary embodiments of the disclosure. An autonomous vehicle V1010 comprises an object detection apparatus 1000. The object detection apparatus 1000 comprises a front camera 1001, and a processing unit 1003. The front camera 1301 coupled to the processing unit 1003, wherein the processing unit 1003 is, for example, a personal computer with Intel Core i9 7900X @ 3.3 GHz, 128 GB DDR4 memory and NVidia Titan X (Pascal) 12 GB VRAM operated by using Python program language, and a sensor data generated by the front camera 1001 has 1280×720 pixels.

Refer to FIG. 10, the object detection apparatus 1000 could accurately detect the object in front of the autonomous vehicle V1010, wherein the average calculating speed reached, for example, 2.934 sec/frame in CPU-based, and the average calculating speed could reach, for example, 0.040 sec/frame in GPU-based. The complexity of the object detection apparatus 1000 could improve an instantaneous calculating speed and reduces unnecessary amount of data of calculation based on a premise of high predictive accuracy. In other words, the processing unit 1003 would be configured at least for processing the sensor data by using a first object detection algorithm to generate a first object detection result, wherein the first object detection result includes bounding box information, processing the first object detection result by using a plurality of stages of sparse update mapping algorithm according to the bounding box information to generate a plurality of stages of updated first object detection result in the CNN model, processing a first stage of the stages of updated first object detection result by using a plurality of stages of spatial pooling algorithm to reduce the spatial dimensions of the stages of updated first object detection result between each of stages of sparse update mapping algorithm, executing a plurality of stages of deep convolution layer algorithm to correspondingly extract a plurality of feature results based on the stages of updated first object detection result in the CNN model, and performing a detection prediction (i.e. $t^{th}$ Inference Result 503 illustrated in FIG. 5) based on a last-stage feature result generated by a last stage of the stages of deep convolution layer algorithm.

It should be noticed that the object detection apparatus 1000 is identical or similar to the object detection apparatus depicted in FIG. 2, FIG. 5. Hence, no further description is provided herein.

In view of the aforementioned descriptions, the disclosure provides an object detection apparatus that is suitable for being used in an autonomous vehicle. Specifically, the purposes of the disclosure may include: finding the bounding box information according to the ROI by using the provided first object detection algorithm, removing the unnecessary calculating region of updated first object detection result by using the provided sparse update mapping algorithm, and providing a plurality of stages of spatial pooling algorithm and a plurality of stages of deep convolution layer algorithm to perform the detection prediction. In this way, an instantaneous calculating speed can be improved.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An object detection method using a CNN model, the method comprising:
    generating, by using a sensor, a sensor data;
    processing the sensor data by using a first object detection algorithm to generate a first object detection result, wherein the first object detection result includes bounding box information;
    processing the first object detection result by using a plurality of stages of sparse update mapping algorithm according to the bounding box information to generate a plurality of stages of updated first object detection result in the CNN model;
    processing a first stage of the stages of updated first object detection result by using a plurality of stages of spatial pooling algorithm to reduce the spatial dimensions of the stages of updated first object detection result between each of stages of sparse update mapping algorithm;
    executing a plurality of stages of deep convolution layer algorithm to correspondingly extract a plurality of feature results based on the stages of updated first object detection result in the CNN model; and
    performing a detection prediction based on a last-stage feature result generated by a last stage of the stages of deep convolution layer algorithm.

2. The object detection method of claim 1, wherein each of the stages of sparse update mapping algorithm comprising:
    generating a box information map with a plurality of bounding boxes as the updated first object detection result by mapping the bounding boxes information to the box information map, wherein the box information map comprised by a plurality of grid cells, and numbers of grid cells in the box information map are the same as numbers of pixels in the sensor data.

3. The object detection method of claim 2, wherein each of the stages of sparse update mapping algorithm further comprising:
    setting the grid cells overlapped with bounding boxes as a first number region and setting the grid cells without the bounding boxes as a second number region; and
    setting a value of the first number region as the first index and setting a value of the second number region as the second index, wherein the first index and the second index are different.

4. The object detection method of claim 3, wherein the first index is 1 and the second index is 0.

5. The object detection method of claim 3, wherein each of the stages of sparse update mapping algorithm further comprising:
    combining any set of the bounding boxes that are spatially overlapping as a singular collection of overlapping bounding boxes.

6. The object detection method of claim 1, wherein each of the stages of deep convolution layer algorithm comprising:
    processing a pre-stage updated first object detection result of the stages of updated first object detection result based on a pre-stage feature result of the feature results by using a position layer algorithm to generate a strip feature map;
    processing the strip feature map by using a convolution layer algorithm to generate a convoluted strip feature map;
    processing the convoluted strip feature map based on a prior-time feature result from an earlier tome point of the stages of deep convolution layer algorithm by using a recovery layer algorithm to generate the feature result; and
    processing the feature result by using a pooling layer algorithm to reduce the spatial dimension of the feature result.

7. The object detection method of claim 6, wherein the position layer algorithm comprising:
    receiving the pre-stage updated first object detection result and the pre-stage feature result;
    dividing the pre-stage updated first object detection result based on the pre-stage feature result to generate a position map with a plurality of image regions, wherein each of the image regions assembled by N*N grid cells, and N is a positive integer;
    setting a value of the image regions overlapped with the first number region as the first index; and
    convoluting the position map to the strip feature map.

8. The object detection method of claim 7, wherein the convolution layer algorithm further comprising:
    convoluting the strip feature map to generate a convoluted strip feature map.

9. The object detection method of claim 8, wherein the recovery layer algorithm further comprising:
    receiving the convoluted strip feature map; and
    operating the convoluted strip feature map and the prior-time feature result to generate the feature result.

10. The object detection method of claim 1, wherein the step of processing the sensor data by using a first object detection algorithm comprising:
    detecting the sensor data to find a region of interest based on a computer vision; and
    generating the bounding box information according to the region of interest.

11. An object detection apparatus comprising:
    a sensor for generating a sensor data; and
    a processor coupled to the sensor and configured at least for:

processing the sensor data by using a first object detection algorithm to generate a first object detection result, wherein the first object detection result includes bounding box information;

processing the first object detection result by using a plurality of stages of sparse update mapping algorithm according to the bounding box information to generate a plurality of stages of updated first object detection result in the CNN model;

processing a first stage of the stages of updated first object detection result by using a plurality of stages of spatial pooling algorithm to reduce the spatial dimensions of the stages of updated first object detection result between each of stages of sparse update mapping algorithm;

executing a plurality of stages of deep convolution layer algorithm to correspondingly extract a plurality of feature results based on the stages of updated first object detection result in the CNN model; and performing a detection prediction based on a last-stage feature result generated by a last stage of the stages of deep convolution layer algorithm.

12. The object detection apparatus of claim 11, wherein each of the stages of sparse update mapping algorithm comprising:
generating a box information map with a plurality of bounding boxes as the updated first object detection result by mapping the bounding boxes information to the box information map, wherein the box information map comprised by a plurality of grid cells, and numbers of grid cells in the box information map are the same as numbers of pixels in the sensor data.

13. The object detection apparatus of claim 12, wherein each of the stages of sparse update mapping algorithm further comprising:
setting the grid cells overlapped with the bounding boxes as a first number region and setting the grid cells without the bounding boxes as a second number region; and
setting a value of the first number region as the first index and setting a value of the second number region as the second index, wherein the first index and the second index are different.

14. The object detection apparatus of claim 13, wherein the first index is 1 and the second index is 0.

15. The object detection apparatus of claim 13 wherein each of the stages of sparse update mapping algorithm further comprising:
combining any set of the bounding boxes that are spatially overlapping as a singular collection of overlapping bounding boxes.

16. The object detection apparatus of claim 11, wherein each of the stages of deep convolution layer algorithm comprising:
processing a pre-stage updated first object detection result of the stages of updated first object detection result based on a pre-stage feature result of the feature results by using a position layer algorithm to generate a strip feature map;
processing the strip feature map by using a convolution layer algorithm to generate a convoluted strip feature map;
processing the convoluted strip feature map based on a prior-time feature result from an earlier tome point of the stages of deep convolution layer algorithm by using a recovery layer algorithm to generate the feature result; and
processing the feature result by using a pooling layer algorithm to reduce the spatial dimensions of the feature result.

17. The object detection apparatus of claim 16, wherein the position layer algorithm comprising:
receiving the pre-stage updated first object detection result and the pre-stage feature result;
dividing the pre-stage updated first object detection result based on the pre-stage feature result to generate a position map with a plurality of image regions, wherein each of the image regions assembled by N*N grid cells, and N is a positive integer;
setting a value of the image regions overlapped with the first number region as the first index; and
convoluting the position map to the strip feature map.

18. The object detection apparatus of claim 17, wherein the convolution layer algorithm further comprising:
convoluting the strip feature map to generate a convoluted strip feature map.

19. The object detection apparatus of claim 18, wherein the recovery layer algorithm further comprising:
receiving the convoluted strip feature map; and
operating the convoluted strip feature map and the prior-time feature result to generate the feature result.

20. The object detection apparatus of claim 11, wherein the processor is configured at least for processing the sensor data by using a first object detection algorithm comprising:
detecting the sensor data to find a region of interest based on a computer vision; and
generating the bounding box information according to the region of interest.

21. The object detection apparatus of claim 11, wherein the sensor comprises a camera.

* * * * *